(12) United States Patent
De Vriendt et al.

(10) Patent No.: US 10,415,473 B2
(45) Date of Patent: Sep. 17, 2019

(54) DEICING NOSE OF AN AXIAL TURBINE ENGINE COMPRESSOR

(71) Applicants: Olivier De Vriendt, Bassenge (BE); Laurent Schuster, Erezee (BE)

(72) Inventors: Olivier De Vriendt, Bassenge (BE); Laurent Schuster, Erezee (BE)

(*) Notice: Subject to any disclaimer, the term of this patent is extended or adjusted under 35 U.S.C. 154(b) by 116 days.

(21) Appl. No.: 15/805,339

(22) Filed: Nov. 7, 2017

(65) Prior Publication Data
US 2018/0112596 A1    Apr. 26, 2018

(51) Int. Cl.
| | | |
|---|---|---|
| F02C 7/04 | (2006.01) | |
| F02C 7/047 | (2006.01) | |
| F01D 25/02 | (2006.01) | |
| F02K 3/02 | (2006.01) | |
| F02K 3/06 | (2006.01) | |
| F04D 29/32 | (2006.01) | |

(52) U.S. Cl.
CPC .............. *F02C 7/047* (2013.01); *F01D 25/02* (2013.01); *F02K 3/02* (2013.01); *F02K 3/06* (2013.01); *F04D 29/321* (2013.01); *F05D 2220/323* (2013.01); *F05D 2240/12* (2013.01); *F05D 2250/313* (2013.01); *F05D 2260/20* (2013.01)

(58) Field of Classification Search
CPC .. F02C 7/04; F02C 7/047; F01D 25/02; F02K 3/02; F02K 3/06; F04D 29/321; F05D 2220/323; F05D 2240/12; F05D 2250/313; F05D 2260/20
See application file for complete search history.

(56) References Cited

U.S. PATENT DOCUMENTS

| | | | | |
|---|---|---|---|---|
| 7,931,235 B2* | 4/2011 | Zanarelli | ................ | B64D 33/02 244/134 B |
| 8,308,110 B2* | 11/2012 | Porte | ........................ | F02C 7/28 244/134 B |

* cited by examiner

*Primary Examiner* — Hieu T Vo
(74) *Attorney, Agent, or Firm* — Eldredge Law Firm; Richard Eldredge

(57) ABSTRACT

The invention relates to a de-icing splitter nose (22) of an axial turbine engine, notably a de-icing splitter nose of a turbo-jet engine compressor. The splitter nose includes an annular row of vanes (26), each of which has a radially extending leading edge (36), and a de-icing system (28) based on hot-air injection. The injection is pulsed, i.e. discontinuous. The system (28) includes an annular row of injection orifices for injecting de-icing fluid (44) onto the vanes (26) in respective injection directions (46). Each injection orifice is associated with a vane such that the injection directions thereof are substantially parallel to the leading edge (36) of the related vane, enabling said vane (26) to be de-iced.

20 Claims, 3 Drawing Sheets

DEICING NOSE OF AN AXIAL TURBINE ENGINE COMPRESSOR

TECHNICAL DOMAIN

The invention relates to the de-icing of a splitter nose of an axial turbine engine. More specifically, the invention relates to a splitter nose with hot-gas de-icing for an axial turbine engine. The invention also relates to an axial turbine engine, in particular a turbo-jet engine of an aeroplane or a turboprop of an aircraft.

PRIOR ART

A turbo-jet engine typically has an inlet split into a primary flow path and a secondary flow path such as to duct the primary flow and the secondary flow respectively. This annular separation is achieved using a splitter nose that splits the incoming flow according to predetermined proportions in order to guarantee a given performance and a given thrust, as a function of operating conditions.

These same operating conditions may cause icing, i.e. ice may form inside the turbo-jet engine. In particular, a layer of ice may cover the splitter nose itself, extending as far as the vanes of the stator housed in the splitter nose. In extreme cases, the accumulation of ice can block the spaces between neighbouring vanes, thereby entirely obstructing the inlet to the primary flow path. The engine then stalls.

In light of this risk, it is common to provide the de-icing nose with a de-icing system. This system can inject a hot air flow towards the vanes in order to melt an ice formation when ice accumulation occurs.

Document U.S. Pat. No. 8,011,172 B2 discloses a dual-flow turbo-jet engine with a splitter nose linked to a stator. The splitter nose is fitted with a de-icing system fed with hot air from the high-pressure compressor. This hot air is fed into the primary flow A such as to be carried by this latter. Each jet of de-icing hot air reaches a vane impact zone, which is thus de-iced. However, the efficiency of this de-icing system is limited because an ice deposit can nonetheless form on the vane about the impact zone. In particular, when the incline of the chord of the vane is too great, the upper surface cannot be reached directly by the air jet.

SUMMARY OF THE INVENTION

Technical Problem

The invention is intended to address at least one of the problems presented by the prior art. More specifically, the invention is intended to improve the efficiency of a de-icing system of a splitter nose. The invention is also intended to propose a simple, robust, lightweight, cheap, reliable solution that is easy to produce, maintain and inspect, and that provides improved performance.

Technical Solution

The invention relates to a de-icing splitter nose of an axial turbine engine with an axis of rotation, notably a de-icing splitter nose of a compressor of an axial turbine engine, the splitter nose comprising: a vane with a leading edge that extends radially, and a de-icing system with an injection orifice designed to inject a de-icing fluid in an injection direction, that is noteworthy in that the injection direction of the injection orifice is generally parallel to the leading edge of the vane in order to deice same.

According to an advantageous embodiment of the invention, the leading edge includes a leading edge radial section that projects radially along at least: 5%, or 10%, or 15%, or 30%, of the radial height of the vane, the leading edge radial section being parallel to the injection direction.

According to an advantageous embodiment of the invention, the injection direction is inclined of at most: 15°, or 10°, or 5°, or 3° with respect to the leading edge and/or with respect to the mean line of the leading edge, and/or with respect to the radial end of the leading edge which is radially level with the injection orifice.

According to an advantageous embodiment of the invention, the injection direction is measured within the injection orifice, and/or the injection direction corresponds to the main axis of the injection orifice.

According to an advantageous embodiment of the invention, the rotation axis is the symmetry axis of the de-icing splitter nose.

According to an advantageous embodiment of the invention, the volumetric pump is a gerotor pump or a rotary-vane type pump.

According to an advantageous embodiment of the invention, the de-icing system includes a volumetric pump to increase the injection pressure of the de-icing fluid.

According to an advantageous embodiment of the invention, the injection direction is generally perpendicular to the axis of rotation of the turbine engine.

According to an advantageous embodiment of the invention, the injection direction is substantially oriented upstream.

According to an advantageous embodiment of the invention, the leading edge includes a mean line, the injection direction being parallel to said mean line.

According to an advantageous embodiment of the invention, the leading edge has a curvature in a plane perpendicular to the axis of rotation.

According to an advantageous embodiment of the invention, the leading edge, and potentially the mean line thereof, is substantially inclined in relation to the radial direction, for example in a plane perpendicular to the axis of rotation and/or in a plane containing the axis of rotation.

According to an advantageous embodiment of the invention, the leading edge has an outer extremity, the injection direction being substantially parallel to the leading edge radially at said outer extremity.

According to an advantageous embodiment of the invention, the injection orifice is substantially arranged axially at the leading edge.

According to an advantageous embodiment of the invention, the de-icing system is designed to inject the de-icing fluid discontinuously.

According to an advantageous embodiment of the invention, the de-icing system is designed to adjust the temperature of the de-icing fluid.

According to an advantageous embodiment of the invention, the de-icing system is designed to adjust the supply pressure of the de-icing fluid.

According to an advantageous embodiment of the invention, the de-icing system includes a pump, notably an additional pump to increase the injection pressure of the de-icing fluid.

According to an advantageous embodiment of the invention, the de-icing system includes at least one valve controlling the supply of the de-icing fluid via the injection orifice.

According to an advantageous embodiment of the invention, the nose includes a wall with a radial overthickness in which the injection orifice is formed.

According to an advantageous embodiment of the invention, the system has an ice detection module at the leading edge, the system being designed to supply de-icing fluid if ice is detected at the leading edge.

According to an advantageous embodiment of the invention, the splitter nose includes a circular splitter edge formed on a circular overthickness arranged upstream of the injection orifice.

According to an advantageous embodiment of the invention, the injection orifice is arranged around the circumference at the leading edge.

According to an advantageous embodiment of the invention, the injection orifice is arranged radially at the outer extremity of the leading edge.

According to an advantageous embodiment of the invention, the orifice includes a nozzle facing substantially upstream.

According to an advantageous embodiment of the invention, the injection orifice is formed, and notably surrounded, by a one-piece portion of the splitter nose, notably by a part forming an inner annular wall of the splitter nose.

According to an advantageous embodiment of the invention, injection is performed by repeated pulses, notably at a given frequency.

The invention also relates to a turbine engine including a de-icing splitter nose, that is noteworthy in that: the de-icing splitter nose is as claimed in the invention, and the turbine engine is preferably a turbo-jet engine with a ducted fan and/or an open fan.

According to an advantageous embodiment of the invention, the turbine engine includes an annular row of vanes each of which has a leading edge, the de-icing system having an annular row of injection orifices for injecting de-icing fluid in a respective injection direction, each injection orifice being associated with a leading edge that is parallel to the related injection direction to enable the de-icing of same.

According to an advantageous embodiment of the invention, the turbine engine includes an upstream compressor, notably a low-pressure compressor, said compressor including an inlet formed by the de-icing splitter nose.

According to an advantageous embodiment of the invention, the turbine engine includes a second compressor, notably a high-pressure compressor, the de-icing system including a hot-air intake opening designed to feed the injection orifice.

In general, the advantageous embodiments of each objective of the invention are also applicable to other objectives of the invention. Where possible, each objective of the invention can be combined with other objectives. The objectives of the invention can also be combined with the embodiments in the description, which can also be combined with one another. The features relating to the vane of the de-icing nose can apply to each vane of the row of vanes. Furthermore, the features relating to the injection orifice can apply to each of the injection orifices of the row of injection orifice.

Advantages

The invention enables a de-icing flow to be injected along the leading edge of the vane being treated. This makes it possible to cover more of the radial height of the vane, and in particular to work from one extremity of the vane. Additionally, the orientation of the flow makes it possible to treat the lower surface of the vane as well as the upper surface as the injected fluid is distributed by the leading edge.

SHORT DESCRIPTION OF THE DRAWINGS

DESCRIPTION OF EMBODIMENTS

In the description below, the terms inner and outer refer to a position in relation to the axis of rotation of an axial turbine engine. The axial direction corresponds to the direction along the axis of rotation of the turbine engine. The radial direction is perpendicular to the axis of rotation. Upstream and downstream refer to the main direction of flow of the flow in the turbine engine.

Figure 1:
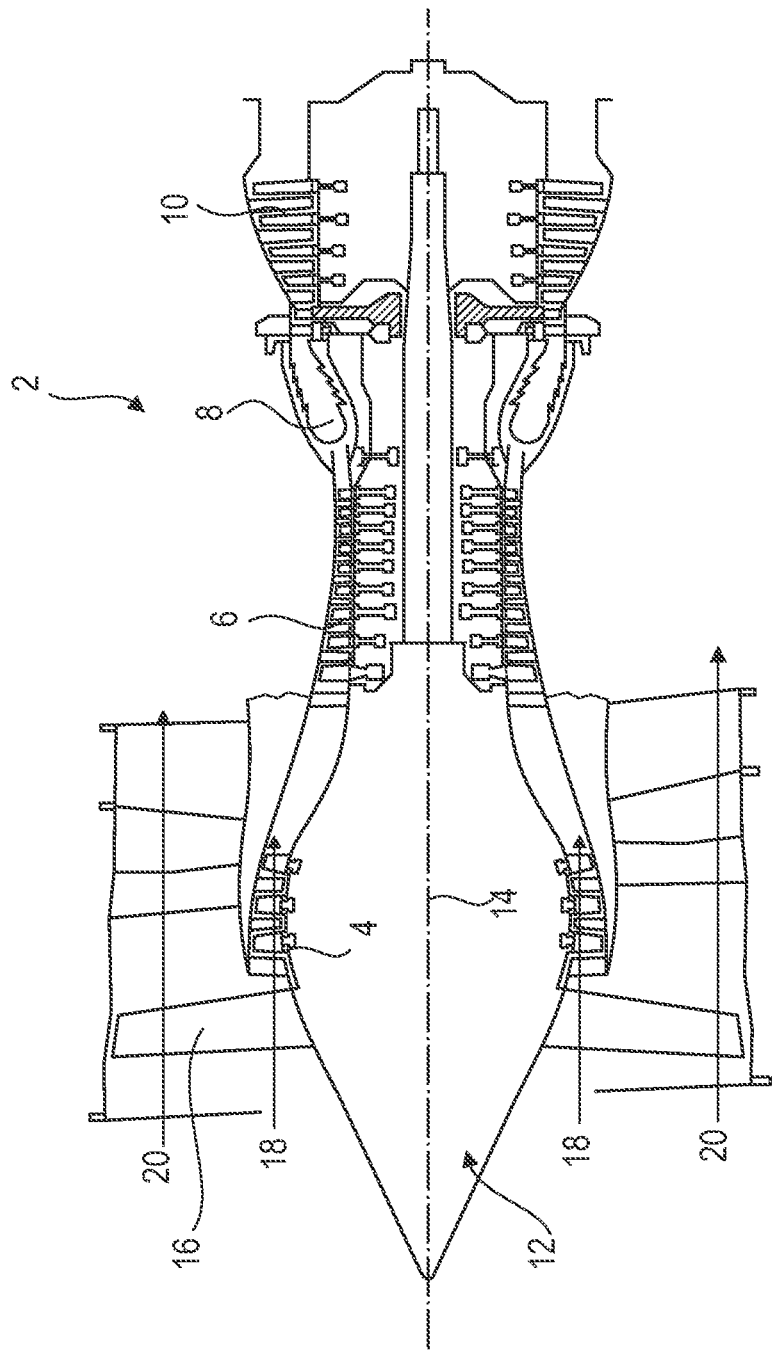
FIG. 1 shows an axial turbine engine according to the invention.

FIG. 1 is a simplified representation of an axial turbine engine. In this specific case, it is a dual-flow turbo-jet engine. The turbo-jet engine 2 has a first compression level, referred to as the low-pressure compressor 4, a second compression level, referred to as the high-pressure compressor 6, a combustion chamber 8, and one or more turbine levels 10. When in operation, the mechanical power of the turbine 10 transmitted via the central shaft to the rotor 12 moves the two compressors 4 and 6. These latter have several rows of rotor blades associated with rows of stator vanes. The rotation of the rotor about the axis of rotation 14 thereof thereby enables an air flow to be generated and progressively compressed until it enters the combustion chamber 8.

An inlet fan 16 is coupled to the rotor 12 and generates an air flow that is divided into a primary flow 18 passing through the different levels mentioned above of the turbine engine, and a secondary flow 20 that passes through an annular duct (partially shown) along the machine before re-joining the primary flow at the outlet of the turbine. The secondary flow can be accelerated to generate a thrust reaction. The primary flow 18 and the secondary flow 20 are radially concentric annular flows. Said flows are channelled by the casing of the turbine engine and/or shrouds. For this purpose, the casing has inner and outer cylindrical walls.

The turbo-jet engine may have a ducted fan in the nacelle or an open fan. Such a fan is arranged about the fairing of the turbo-jet engine or about the nacelle. Such fans are also known as open rotors.

Figure 2:
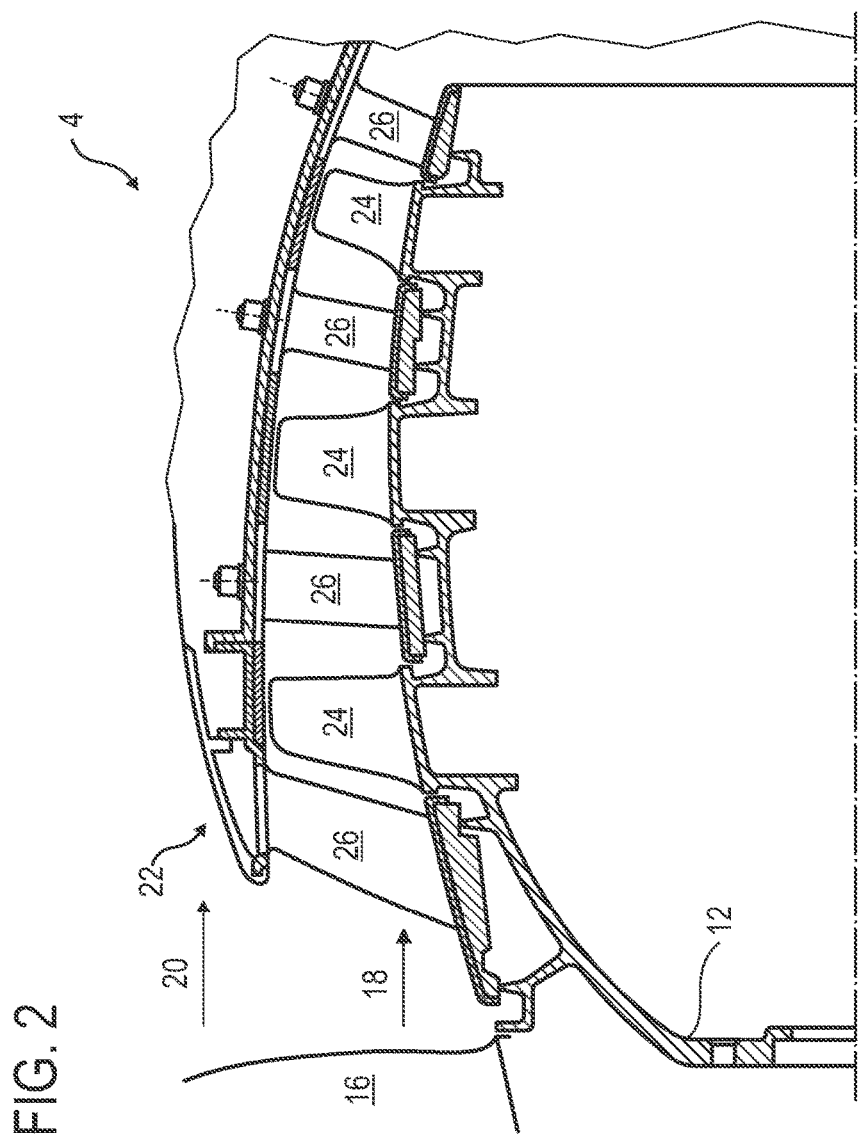
FIG. 2 is a diagram of a turbine engine compressor according to the invention.

FIG. 2 is a cross section of a compressor of an axial turbine engine, such as the one in FIG. 1. The compressor may be a low-pressure compressor 4. A part of the fan 16 and the splitter nose 22 of the primary flow 18 and of the secondary flow 20 are shown. The rotor 12 includes several rows of rotor blades 24, in this case three.

The low-pressure compressor 4 includes several stators, in this case four, that each contain a row of stator vanes 26. The stators are related to the fan 16 or to a row of rotor blades to guide the air flow, such as to convert the speed of the flow into static pressure.

Figure 3:
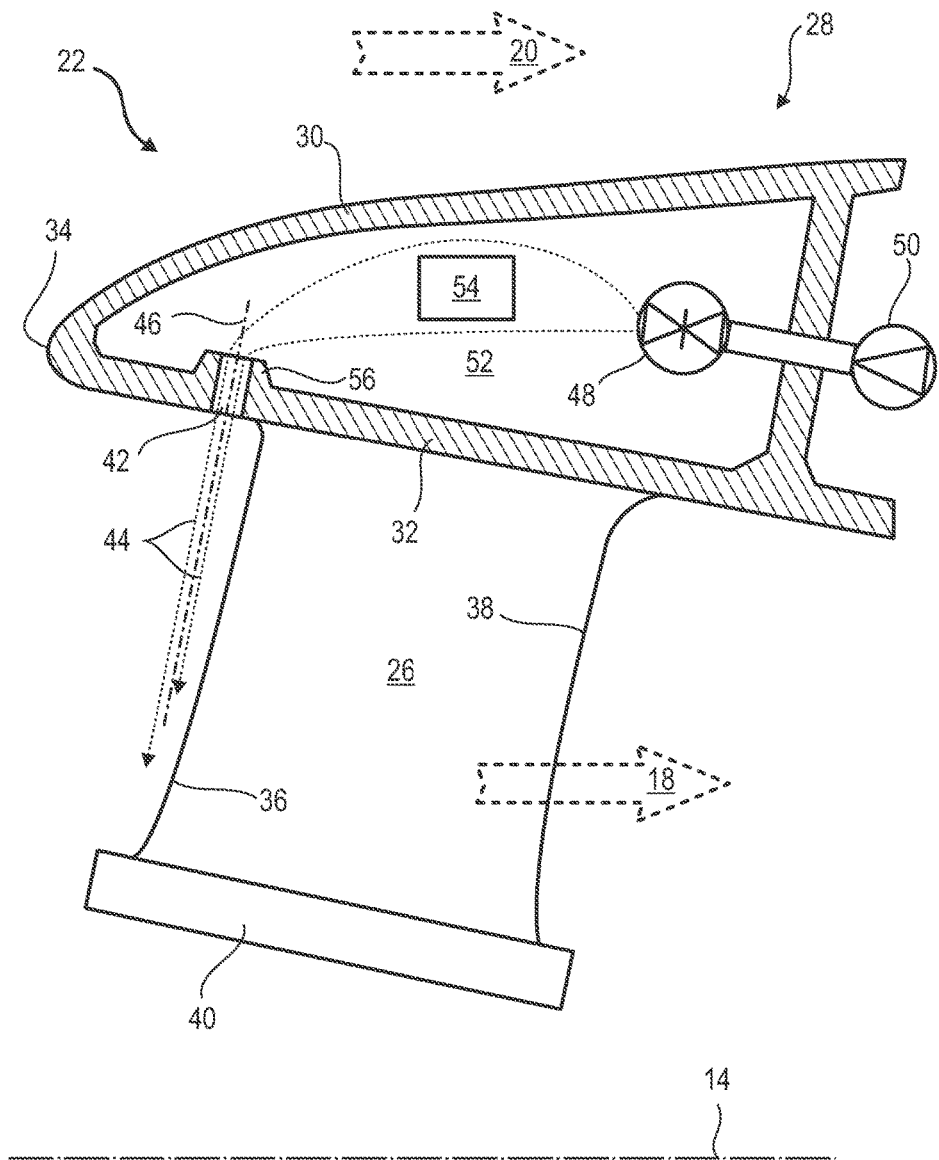
FIG. 3 shows a de-icing splitter nose according to the invention.

The stator vanes 26 extend essentially radially from an outer casing and may be fixed to same and immobilized using shafts. Within a single row, the stator vanes 26 are regularly spaced out in relation to one another and each have the same angular orientation in the flow. Advantageously, the vanes in a single row are identical. Optionally, the spacing between the vanes and the angular orientation of same can vary locally. Certain vanes may differ from the other vanes in a given row. The casing may be formed by several rings or half-shells. FIG. 3 is a magnified view of the splitter nose 22 such as the one shown in FIG. 2.

The splitter nose 22 is given de-icing capacity by adding a de-icing system 28. This de-icing system can work using a de-icing agent, for example a hot gas drawn from the downstream portion of the high-pressure compressor. Alternatively, this de-icing fluid may be a liquid having physical-chemical properties designed to dissolve the ice formed in the splitter nose.

The splitter nose 22 includes an outer annular wall 30 and an inner annular wall 32, such as an outer shroud. The figure also shows an upstream annular splitter surface that delimits the primary flow 18 and the secondary flow 20. In particular, the circular splitter edge 34 is the interface that determines the proportions between the primary flow 18 and the secondary flow 20. Furthermore, the splitter edge 34 may be formed on an overthickness that forms a circular join between the walls (30; 32). The upstream circular edge of the nose 22 may be used to circularly split the flow entering the turbine engine. Furthermore, the outer shroud of the splitter nose 22 bears an annular row of stator vanes 26. The stator vanes 26 can form the intake stator of the compressor. Although only one vane 26 is shown, the present description can apply to each of the vanes 26 in the annular row.

The vane 26 extends radially inwards from the inner wall 32. The vane has a leading edge 36 and a trailing edge 38. Furthermore, the figure shows a lower surface and an upper surface that lie between the leading edge and the trailing edge. Like the leading edge 36 and the trailing edge 38, these surfaces extend from the inner wall 32 and potentially to an optional inner shroud 40.

The de-icing system 28 has a plurality of injection orifices 42 for de-icing fluid 44 that are arranged in a circle about the axis of rotation 14. Although only one injection orifice 42 is shown, the present teaching can apply to each of the injection orifices 42 in the row. Each injection orifice 42 can be associated with a vane 26 to form a pair. Each pair can be identical. The injection orifice 42 can be elongate in a main direction, potentially radial, in order to guide the de-icing fluid 44. The nozzle of same may be oriented upstream. The injection orifice 42 may be elongate in a dedicated injection direction 46. Advantageously, the injection direction 46 is generally parallel to the leading edge 36 of the associated vane 26.

The injection orifice 42 may be substantially arranged upstream of the vane 26, for example radially at the outer extremity of same, which is also referred to as the vane tip. The injection orifice 42 may be positioned axially beside the leading edge 36, for example where same is inclined forwards and/or about the circumference. When in operation, the de-icing fluid 44 is driven against the vane 26 by the primary flow 18, and in particular against the leading edge 36 in order to deice same. Thus, the jet of de-icing fluid 44 closely follows the leading edge 36 in order to deice same more efficiently. The leading edge 36 can be de-iced over a greater radial length. Thus, given that the leading edge 36 of the vane is intended to cut through the de-icing fluid 44, said leading edge distributes the de-icing fluid over the lower surface and the upper surface lying behind same.

The spatial orientation of the injection direction 46 can be optimized. The injection direction may be substantially orthogonal to the axis of rotation 14 of the turbine engine. Thus, the de-icing fluid 44 tends to follow the leading edge 36 rather than flowing downstream before meeting the vane 26. To adapt to the feed of the primary flow 18 and/or to follow the leading edge 36, the injection direction can be tilted upstream.

More specifically, the leading edge 36 of the vane 26 forms a mean line in space. This may be a geometric mean in space, or possibly a straight line linking the radial extremities of the leading edge 36. Consequently, the injection direction 46 may be parallel to said mean line. Thus, same can follow any curvature of the leading edge 36 regardless of whether this latter falls within a plane perpendicular to the axis of rotation or an axial plane containing the axis of rotation 14. Similarly, the injection direction 46 can also follow any inclination of the leading edge 36 in the aforementioned planes. In one specific approach, the injection direction 46 and/or the injection orifice 42 may be flush with the leading edge 36 at the outer root or the vane tip extremity thereof.

The de-icing system 28 is designed to inject the de-icing fluid 44 alternately, i.e. discontinuously. This outcome can be achieved using different types of equipment, for example a controlled valve 48 and/or an additional pump 50, i.e. in addition to the compressor from which the de-icing fluid 44 is drawn. The valve 48 makes it possible to open and cut off the flow of de-icing fluid 44 in the plenum 52 formed between the outer wall 30 and the inner wall 32. The pump 50 makes it possible to increase the pressure and/or the injection speed of the de-icing fluid 44 in order to cover a greater length of the leading edge 36. This increases the efficiency of the de-icing system 28 and enhances the operational safety of the turbine engine.

Also with a view to improving efficiency and safety, the de-icing system 28 may include heating elements 54 designed to further increase the temperature of the de-icing fluid 44. Said elements may be electrical elements. Said elements may increase the intake temperature from the high-pressure compressor. These heating elements 54 may be positioned in the plenum 52 or outside and downstream.

The injection orifice 42 may pass through the inner wall 32. The injection orifice may be formed in a radial overthickness 56, which helps to better orient the de-icing fluid 44 and to better achieve the target injection direction 46. Each radial overthickness 56 can project into the plenum 52.

The de-icing system 28 can operate as a function of the presence of ice. In this regard, the system may include an ice detection module (not shown) designed to detect the formation of ice in the splitter nose 22. The detection method may be optical. This can detect the presence of ice on the leading edge 36, on a lower surface and on the upper surface. The detection module can also monitor the inner and outer shrouds. This system can check for the accumulation of ice in the passages between the vanes 26. When the detection module detects ice, the de-icing system 28 supplies de-icing fluid 44, for example by opening the controlled valve 48 and actuating the additional pump 50.

The invention claimed is:

1. A de-icing splitter nose of an axial turbine engine with an axis of rotation, the splitter nose comprising:
   a vane with a leading edge that extends radially, and
   a de-icing system with an injection orifice structurally and functionally designed to inject a de-icing fluid in an injection direction,
   the injection direction of the injection orifice being generally parallel to the leading edge of the vane.

2. The splitter nose according to claim 1, wherein the injection direction is generally perpendicular to the axis of rotation of the turbine engine, the injection direction being inclined of at least 80° with respect to the axis of rotation.

3. The splitter nose according to claim 1, wherein the injection direction is substantially oriented upstream.

4. The splitter nose according to claim 1, wherein the leading edge includes a mean line, the injection direction being generally parallel to said mean line.

5. The splitter nose according to claim 1, wherein the leading edge has a curvature in a plane perpendicular to the axis of rotation.

6. The splitter nose according to claim 1, wherein the leading edge is substantially inclined in relation to the radial direction, in a plane perpendicular to the axis of rotation and/or in a plane containing the axis of rotation.

7. The splitter nose according to claim 1, wherein that the leading edge has a radial outer extremity, the injection direction being substantially parallel to the leading edge radially at said outer extremity.

8. The splitter nose according to claim 1, wherein the injection orifice is substantially arranged axially at the leading edge, the leading edge projecting radially upstream and axially overlap the injection orifice.

9. The splitter nose according to claim 1, wherein the de-icing system is structurally and functionally designed to inject the de-icing fluid discontinuously.

10. The splitter nose according to claim 1, wherein the de-icing system is designed to adjust the temperature of the de-icing fluid, and includes a heater structurally and functionally adapted for heating the de-icing fluid.

11. The splitter nose according to claim 1, wherein the de-icing system is designed to adjust the supply pressure of the de-icing fluid and includes an additional pump structurally and functionally adapted to increase the de-icing fluid's pressure.

12. The splitter nose according to claim 1, wherein the de-icing system includes at least one valve controlling the supply of the de-icing fluid via the injection orifice.

13. The splitter nose according to claim 1, wherein it encloses a wall with a radial overthickness in which the injection orifice is formed, the vane extending radially inward from the wall, said radial overthickness projecting in the radial opposite direction than the vane.

14. The splitter nose according to claim 1, wherein the system comprises an ice detection module at the leading edge, the system being structurally and functionally designed to supply de-icing fluid if ice is detected at the leading edge by the ice detection module.

15. The splitter nose according to claim 1, wherein the splitter nose includes a circular splitter edge formed on a solid circular overthickness arranged upstream of the injection orifice.

16. A low pressure turbine engine compressor comprising an axis of rotation and a de-icing splitter nose, the de-icing splitter nose including:
an upstream vane with a trailing edge,
a downstream vane with a leading edge that extends radially and which is arranged downstream the upstream edge, and
a de-icing system which includes an injection orifice structurally and functionally designed to inject a de-icing fluid in an injection direction which is axially between the leading edge and the trailing edge and which is generally parallel to the leading edge of the downstream vane.

17. A turbine engine including a de-icing splitter nose and a ducted fan, the de-icing splitter nose comprising:
a vane with a leading edge that extends radially, and
a de-icing system with an injection orifice structurally and functionally designed to inject a de-icing fluid in an injection direction,
the injection direction of the injection orifice is generally parallel to the leading edge of the vane and being directed toward the ducted fan.

18. The turbine engine according to claim 17, wherein the vane is a first vane, and the turbine engine includes an annular row of vanes each of which has a leading edge, the first vane being part of the annular row, the de-icing system including an annular row of injection orifices for injecting de-icing fluid in a respective injection direction, each injection orifice being associated with a leading edge that is parallel to the related injection direction to enable the de-icing of same.

19. The turbine engine according to claim 17, wherein it includes a low-pressure compressor with an inlet formed by the de-icing splitter nose.

20. The turbine engine according to claim 17, wherein it comprises a high-pressure compressor with a hot-air intake opening designed to feed the injection orifice, said hot-air intake opening being connected to the injection orifice.

* * * * *